United States Patent Office 3,500,024
Patented Mar. 10, 1970

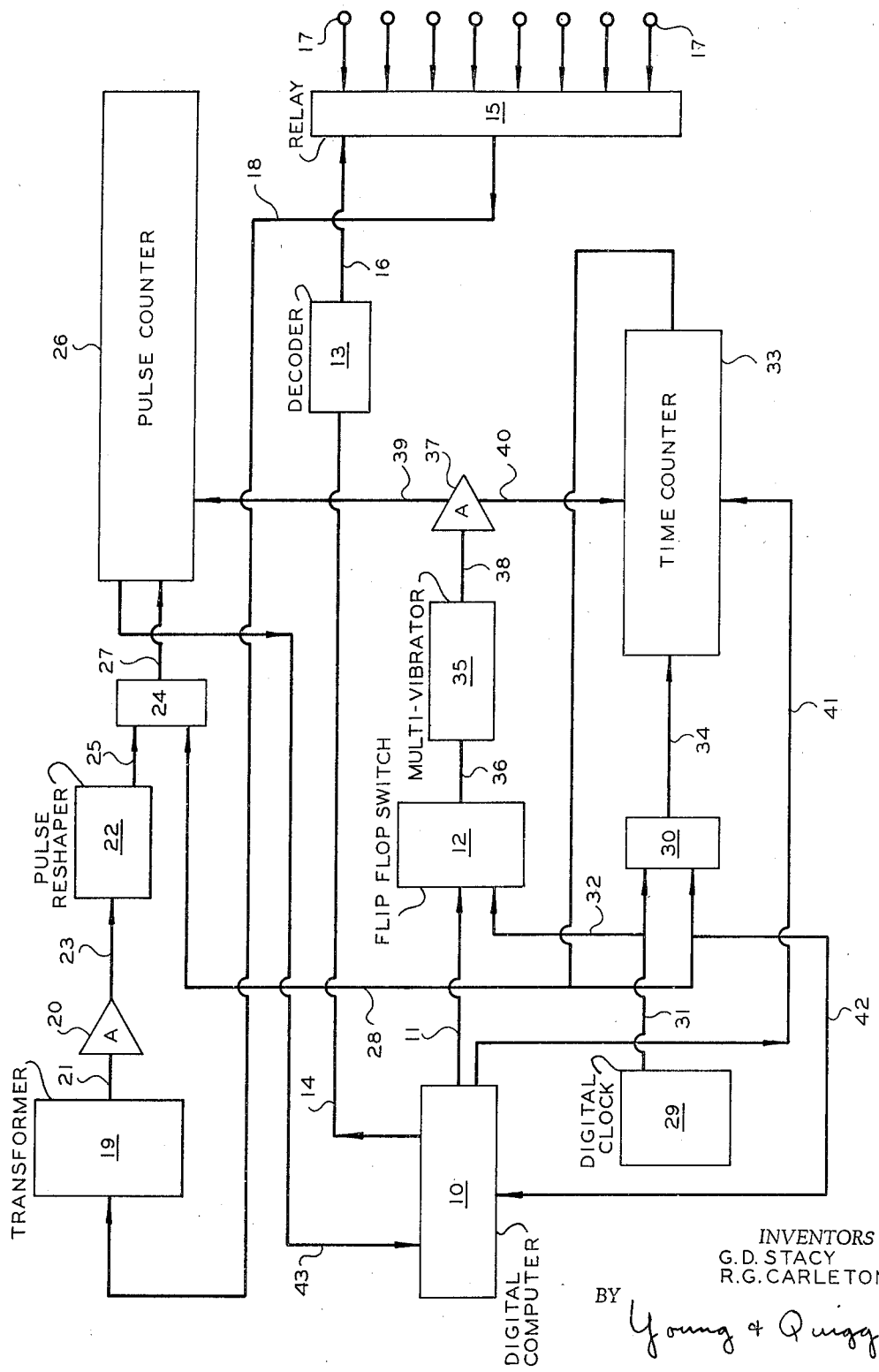

3,500,024
DIGITAL DATA INPUT SYSTEM
Galen D. Stacy, Bartlesville, Okla., and Robert G. Carleton, Saxonville, Mass., assignors to Phillips Petroleum Company, a corporation of Delaware
Filed Feb. 1, 1967, Ser. No. 613,201
Int. Cl. G06f 7/38; G06g 7/00
U.S. Cl. 235—92
5 Claims

ABSTRACT OF THE DISCLOSURE

A digital data input system for a digital computer is provided wherein signal pulses from any one of a series of process measuring instruments are converted to digital form and counted over a preselected time period. At the end of the selected time period the computer will be automatically interrupted to receive the counted data.

---

This invention relates to a digital data input system. In another aspect, this invention relates to an improved digital data input system wherein data from a selected data transmitter is collected over a predetermined time period, and then the computer operation at the end of this time period is interrupted to thereby allow the collected data to be fed thereto.

Process condition sensing elements, such as turbine flow meters, positive displacement flow meters, etc., are normally used to measure a rate-type process condition over a fixed period of time. Moreover, in many operations, it is desirable to use the same sensing element for several purposes. For example, when utilizing a turbine flow meter, it may be desirable to measure flow over a relatively short period of time to obtain an instantaneous flow rate or it may be desirable to obtain the actual total flow integrated over a longer time increment.

Since most chemical and physical processing operations require a multitude of these process variable measuring devices, and since these devices are primarily digital in nature and require digital transmission in order to retain their accuracy, digital computers have often been employed to receive and process these data and to automatically control manufacturing operations.

When utilizing a digital process control-computing system, data from the various process measuring devices are sequenced into the computer input register in accordance with the computer input program. However, most existing data input systems require that data from any one transmitting device be collected over a fixed time increment and fed into the input register of the computer only upon receiving a read or input signal from the computer. Therefore, there is needed a flexible digital data input system that will not only select the proper data transmitter and measure the output thereof but will select a time period for measuring the data transmitted therefrom and then automatically interrupt the computer at the end of the time period for input of the measured data.

Accordingly, an object of this invention is to provide an improved system of data input to a computer wherein both the data transmitter and the data transmitting period are programmed and the computer is automatically interrupted at the end of the transmitting period for input of the measured data.

Other objects, advantages, and features of this invention will be readily apparent to those skilled in the art from a reading of the disclosure.

According to the invention, an improved data input system for a digital computer is provided whereby data from any one of a series of process measuring devices can be collected and fed into the digital computer by programming a selection of the data transmitter, programming a selection of the period for counting pulses transmitted by the selected data transmitter, and providing for the automatic interruption of the digital computer at the end of the counting period. This system is flexible in that not only can a particular data transmitter be selected, but, also, the time period for counting the pulses transmitted by the selected data transmitter can vary with each counting cycle for each data transmitter. Also, by automatically interrupting the digital computer at the end of the counting period, the digital computer is free to continue with other operations during the counting period. Thus, that portion of the computer operating period required for receiving input data is minimized.

This invention can be more easily understood from a study of the drawing, which is a schematic representation of a preferred embodiment of this invention.

A general description of the basic components of the system will facilitate the understanding thereof. These basic components comprise digital computer 10; a pulse signal input-data measurement system comprising decoder 13, relay 15, data transmitters 17, transformer 19, amplifier 20, pulse reshaper 22, gate 24, and pulse counter 26; a time measuring system comprising digital clock 29, gate 30, and time counter 33; and a signal input-time coordination system comprising flip flop switch 12, multi-vibrator 35, and amplifier 37.

Referring again to the drawing, the operation of the system will be described as follows. The invention as illustrated in the drawing is employed to control the transmission of data signals from eight data-transmitting sources, each said source transmitting AC pulse signals representative of process data as determined by conventional process variable measuring devices. It must be understood that the selection of eight data transmitters is in no way intended to limit the scope of this invention.

At the beginning of each counting period, flip flop switch 12 is in the reset position from the last counting cycle. However, maintaining flip flop 12 in this position has no effect on one-shot multi-vibrator 35. Flip flop switch 12 can be any suitable flip flop switch known in the art, such as FA–30 flip flop distributed by Computer Control Corporation, Framingham, Mass., and illustrated on page 3–89 in Publication No. 71–100A. A suitable multi-vibrator is the TO3 dual one-shot multi-vibrator manufactured by Packard Bell Computer Corporation, Los Angeles 25, Calif., and illustrated in catalog SP–120. First, digital computer 10 transmits a multi-bit signal to decoder 13 via control cable 14. This signal is decoded in decoder 13, and a signal is passed from decoder 13 to appropriate relay 15 via control cable 16 which indicates which of the process variables 17 will be measured and, consequently, the position of relay 15. Relay 15 can be a series of relays and corresponding relay drivers which are actuated in response to signals received from control cable 16. Any type digital computer known in the art can be used in the practice of this invention. Therefore, if sufficient signals are available from the computer, decoder 13 and relay 15 would not be necessary because control channels could be connected between each data transmitter and transformer 19.

When relay 15 is actuated in accordance with the signal transmitted via channel 16, signals from one of the data transmitters 17 pass to isolation transformer 19 via channel 18. The resulting signals from isolation transformer 19 are passed to amplifier 20 via channel 21 wherein they are amplified to the proper magnitude to form resulting amplified signals which are passed to pulse reshaper 22 via channel 23. Pulse reshaper 22 reshapes these signals which are in the form of alternating current signals to square wave signals of digital form desired for triggering succeeding circuitry. An instrument capable of reshaping the alternating current signals is known as the ST-1 dual Schmitt trigger distributed by Computer Control Corporation, Framingham, Mass., and illustrated in Publication No. 71–100A. The reshaped pulses are transmitted to gating switch 24 via channel 25. Gating switch 24 transmits the reshaped pulses received via channel 25 to a pulse counter 26 via channel 27 until an inhibit signal is transmitted to gating switch 24 via channel 28. Gating switch 24 is a conventional Nand gate such as one disclosed in the article "Nor/Nand Logic the Easy Way" by Charles F. Hill on pages 81–83 of Control Engineering Magazine, published in May 1964. Pulse counter 26 can be any type pulse counter, such as a binary, decimal, duo-decimal, or octal counter; however, it is preferred that pulse counter 26 be a 16 to 20-bit binary counter.

Thus, as a result of the actuating signal from digital computer 10 to decoder 13 via conduit 14, data indicative of the desired process variable to be measured is transferred to and stored in pulse counter 26.

At this time, or shortly prior thereto, digital computer 10 will transmit a signal or signals via cable 41 which represents the desired time interval to be utilized for the selected process variable being measured. For example, the time interval can be 2, 6, 20, 60 seconds, or any other period representing the time interval during which it is desired to measure the selected variable.

Digital clock 29 is constantly emitting a known number of pulses per unit of time, such as one pulse per second. These pulses are transmitted via channel 31 to gating switch 30 and via channel 32 to flip flop switch 12. Gating switch 30 is a Nand gate similar to gating switch 24 and transmits these pulses to time counter 33 via channel 34 until an inhibit signal is transmitted thereto via channel 28. Time counter 33 can be the same type of counter as pulse counter 26; however, it is preferred that time counter 33 be an 8 to 12-bit binary counter depending upon the time intervals to be measured. Also, the pulses passing to flip flop switch 12 via chanel 32 have no effect upon the state of flip flop switch 12 until flip flop switch 12 is set in its second stable state by pulse signals from computer 10 via channel 11.

Thus, at this time pulse counter 26 is counting the pulses transmitted from one of the data transmitters 17, and time counter 33 is counting the time pulses emitting from digital clock 29.

When the selected time interval has been measured, an inhibit signal will pass from time counter 33 to gating switches 24 and 30 via channel 28. This inhibit signal will prevent pulses which are representative of process variables from passing to pulse counter 26 via channel 27, and it will prevent time pulses from digital clock 29 from passing to time counter 33 via channel 34. Thus, this inhibit signal will effectively stop all counting operations. The inhibit signal will simultaneously pass as an interrupt signal to digital computer 10 via channel 42. After the interrupt signal has entered digital computer 10, the computer operation will become interrupted for a time sufficient to allow the counted pulses representative of process variables to be passed from pulse counter 26 into the computer input register via channel 43.

Next, a set signal will be transmitted to flip flop switch 12 from computer 10 via channel 11 which will thereby cause flip flop switch 12 to change its state and become conditioned for reception of a reset pulse by channel 32.

Therefore, the next pulse to reach flip flop switch 12 via channel 32 from digital clock 29 will reset flip flop switch 12 and result in a pulse being transmitted to one-shot multi-vibrator 35 via channel 36. The resulting output from one-shot multi-vibrator 35 will pass to non-inverting amplifier 37 via channel 38. A corresponding amplified output will pass to pulse counter 26 and time counter 33 via channels 39 and 40, respectively. This one-shot pulse will reset both counters to zero and will last longer than the duration of the short pulses emitted from digital clock 29 (1 second if a 60-pulses-per-minute clock is utilized) in order to keep the first bit in time counter 33 from being pulsed before both counters are reset.

Therefore, a complete cycle of operation has been carried out, and a new cycle is begun by the transference of new signals to decoder 13 via channel 14 and to time counter 33 via channel 41 simultaneous with, or shortly prior to, the new set signal to flip flop switch 12 as described above.

As will be evident to those skilled in the art, various modifications of this invention can be made in light of the foregoing disclosure and discussion without departing from the spirit or scope thereof.

We claim:

1. Apparatus comprising in combination, means for transmitting signal pulses representative of several measurable quantities; relay means operatively connected to said means for transmitting signal pulses for selecting the transmission of signal pulses representing one of said measurable quantities; digital computer means; means for transferring a selection signal from said digital computer means to said relay means; means for converting signal pulses representative of said measurable quantities into digital form; means for passing signal pulses from said relay means to said means for converting the signal pulses into digital form; first counting means for counting the frequency of digital pulses; first gate means for passing digital pulses from said means for converting signal pulses to said first counting means; digital clock means for passing digital signals having a constant frequency; second counting means for counting said digital signals from said digital clock means; second gate means for passing digital signals from said digital clock means to said second counting means; switch means; means for passing set signals from said digital computer means to said switch means; means for passing reset signals from said digital clock means to said switch means to actuate said switch means and cause a reset signal to be transferred therefrom; means for passing said reset signal to said first and second counting means; means for passing signals representative of time periods to be counted from said digital computer means to said second counting means; means for passing an inhibit signal from said second counting means to said first and second gate means; means for passing an interrupt signal from said second counting means to said digital computer means simultaneously with said inhibit signal; and means for passing signals representative of counted digital pulses from said first counting means to said digital computer means.

2. The apparatus of claim 1 wherein said means for passing said signal pulses from said relay means to said means for converting signal pulses into digital form comprises isolation transformer means, means for passing said signal pulses from said relay means to said isolation transformer means, amplifier means, means for passing signal pulses from said isolation transformer means to said amplifier means, and means for passing signal pulses from said amplifier means to said means for converting signal pulses into digital form.

3. The apparatus of claim 2 wherein said means for passing said reset signal to said first and second counting means comprises one-shot multi-vibrator means, means for transmitting said reset signal from said flip flop switch to said one-shot multi-vibrator means, non-inverting amplifier means, means for transferring a reset signal from said one-shot multi-vibrator means to said non-inverting amplifier means, and means for transferring an amplified reset signal from said non-inverting amplifier means to said first and second counting means.

4. The apparatus of claim 3 wherein said digital clock passes digital signals at a frequency of 60 pulses per minute.

5. The apparatus of claim 4 wherein said first and second counting means are binary counter means.

References Cited

UNITED STATES PATENTS 2,680,240  6/1954  Greenfield _____ 340—183
2,849,704  8/1958  Neff _____ 340—174

MAYNARD R. WILBUR, Primary Examiner

ROBERT F. GNUSE, Assistant Examiner

U.S. Cl. X.R.

340—183